(12) United States Patent
Washio

(10) Patent No.: US 10,443,713 B2
(45) Date of Patent: Oct. 15, 2019

(54) CONTROL DEVICE FOR VEHICLE DRIVE SYSTEM

(71) Applicant: TOYOTA JIDOSHA KABUSHIKI KAISHA, Toyota-shi, Aichi-ken (JP)

(72) Inventor: Taichi Washio, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 15/843,500

(22) Filed: Dec. 15, 2017

(65) Prior Publication Data

US 2018/0180174 A1 Jun. 28, 2018

(30) Foreign Application Priority Data

Dec. 24, 2016 (JP) ................................ 2016-250289

(51) Int. Cl.

| | |
|---|---|
| F16H 61/02 | (2006.01) |
| F16H 61/662 | (2006.01) |
| F16H 37/08 | (2006.01) |
| F16H 59/18 | (2006.01) |
| F16H 59/42 | (2006.01) |

(Continued)

(52) U.S. Cl.
CPC ..... F16H 61/0204 (2013.01); F16H 37/0846 (2013.01); F16H 61/662 (2013.01); F16H 61/66272 (2013.01); F16H 59/18 (2013.01); F16H 59/42 (2013.01); F16H 59/44 (2013.01); F16H 2061/6609 (2013.01)

(58) Field of Classification Search
CPC ............... F16H 61/0204; F16H 61/662; F16H 61/66272; F16H 37/0846; F16H 59/18; F16H 59/42; F16H 59/44; F16H 2061/6609

See application file for complete search history.

(56) References Cited

U.S. PATENT DOCUMENTS

| | | | |
|---|---|---|---|
| 6,063,002 A * | 5/2000 | Nobumoto | .......... F16H 61/6648 477/41 |
| 6,217,473 B1 * | 4/2001 | Ueda | ....................... F16H 15/38 475/216 |
| 9,309,970 B2 * | 4/2016 | Kamiyamaguchi | ... F16H 37/086 |

(Continued)

FOREIGN PATENT DOCUMENTS

| | | |
|---|---|---|
| JP | 2006-242250 A | 9/2006 |
| JP | 2014-214791 A | 11/2014 |
| JP | 2016-3673 A | 1/2016 |

OTHER PUBLICATIONS

WO201573637 A1 (Matsuo et al.)—Nov. 19, 2015, machine translation.*

*Primary Examiner* — Tinh T Dang

(74) *Attorney, Agent, or Firm* — Oliff PLC

(57) ABSTRACT

An upshift target turbine rotational speed and a target primary rotational speed are calculated based on a target input shaft rotational speed restricted in a range of an upper limit guard value to a lower limit guard value. Thus, the difference between the upshift target turbine rotational speed and the target primary rotational speed is suitably decreased. When a torque transmission path is switched from a second transmission path to a first transmission path, the difference between an actual turbine rotational speed at a switching start time point and the actual turbine rotational speed at a switching completion time point is reduced.

7 Claims, 6 Drawing Sheets

(51) Int. Cl.
  *F16H 59/44*   (2006.01)
  *F16H 61/66*   (2006.01)

(56) References Cited

U.S. PATENT DOCUMENTS

| | | | |
|---|---|---|---|
| 9,695,766 B2* | 7/2017 | Matsuo | F16H 61/04 |
| 9,810,321 B2* | 11/2017 | Nakamura | B60W 30/20 |
| 9,970,522 B2* | 5/2018 | Fujita | F16H 59/44 |
| 10,001,179 B2* | 6/2018 | Kimura | F16D 48/066 |
| 10,047,859 B2* | 8/2018 | Hattori | F16H 61/66259 |
| 10,066,746 B2* | 9/2018 | Fukao | F16H 61/66272 |
| 10,196,061 B2* | 2/2019 | Kimura | B60W 10/107 |
| 2017/0037965 A1* | 2/2017 | Inoue | F16H 37/022 |
| 2017/0159814 A1 | 6/2017 | Fukao et al. | |
| 2018/0180180 A1* | 6/2018 | Moritomo | F16H 61/702 |
| 2018/0335134 A1* | 11/2018 | Ohgata | F16H 61/12 |
| 2019/0061767 A1* | 2/2019 | Terada | F16H 61/14 |

* cited by examiner

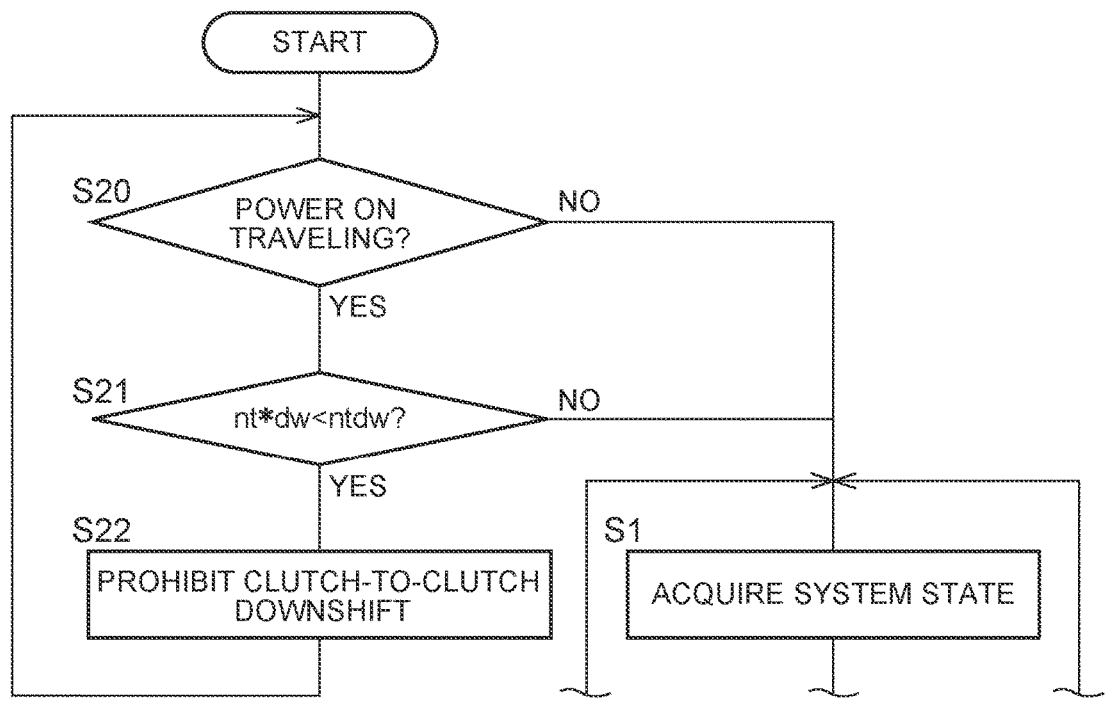

CONTROL DEVICE FOR VEHICLE DRIVE SYSTEM

CROSS-REFERENCE TO RELATED APPLICATIONS

This application claims priority to Japanese Patent Application No. 2016-250289 filed on Dec. 24, 2016, which is incorporated herein by reference in its entirety.

BACKGROUND

1. Technical Field

The present disclosure relates to a technology for a vehicle drive system including, between an input shaft and an output shaft, a continuously variable transmission mechanism, a gear power transmission mechanism having at least one gear ratio, and a clutch mechanism selectively switching between a first transmission path and a second transmission path. Torque transmitted to the input shaft through the continuously variable transmission mechanism is transmitted to the output shaft through the first transmission path. Torque transmitted to the input shaft through the gear power transmission mechanism is transmitted to the output shaft through the second transmission path. When switching is made between the first transmission path and the second transmission path, the technology suitably reduces the difference between the actual rotational speed of the input shaft at the switching start time point and the actual rotational speed of the input shaft at the switching completion time point.

2. Description of Related Art

A control device for a vehicle drive system is known. For example, the vehicle drive system includes, between an input shaft to which torque output from a drive power source is transmitted, and an output shaft outputting torque to a drive wheel, a continuously variable transmission mechanism, a gear power transmission mechanism having at least one gear ratio, and a clutch mechanism selectively switching between a first transmission path and a second transmission path. Torque transmitted to the input shaft through the continuously variable transmission mechanism is transmitted to the output shaft through the first transmission path. Torque transmitted to the input shaft through the gear power transmission mechanism is transmitted to the output shaft through the second transmission path. The control device selectively switches between the first transmission path and the second transmission path in accordance with a traveling state of a vehicle. The known control device is a control device for a vehicle drive system disclosed in Japanese Unexamined Patent Application Publication No. 2016-003673 (JP 2016-003673 A).

SUMMARY

In the control device for the vehicle drive system, a switching target input shaft rotational speed for switching between the first transmission path and the second transmission path and a continuously variable transmission target primary rotational speed for controlling the shift ratio of the continuously variable transmission mechanism may be calculated independently of each other by using, for example, a vehicle speed and an accelerator operation amount. However, when the switching target input shaft rotational speed and the continuously variable transmission target primary rotational speed are calculated independently of each other under settings of, for example, an upper limit guard value that sets an upper limit of the rotational speed of the input shaft when the second transmission path is selected due to a hard protection request in the gear power transmission mechanism, and a lower limit guard value that sets a lower limit of the rotational speed of the input shaft when the first transmission path is selected due to a hard protection request in the continuously variable transmission mechanism, the difference between the switching target input shaft rotational speed and the continuously variable transmission target primary rotational speed is comparatively increased even when, for example, the accelerator operation amount is the same. When switching is made between the first transmission path and the second transmission path, a problem arises in that the difference between the actual rotational speed of the input shaft at the switching start time point and the actual rotational speed of the input shaft at the switching completion time point is increased.

The present disclosure is conceived in view of the above matter and provides a control device for a vehicle drive system. When switching is made between a first transmission path and a second transmission path, the control device can suitably reduce the difference between the actual rotational speed of an input shaft at the switching start time point and the actual rotational speed of the input shaft at the switching completion time point.

An aspect of the present disclosure relates to a control device for a vehicle drive system. The vehicle drive system includes, between an input shaft to which torque output from a drive power source is transmitted, and an output shaft outputting torque to a drive wheel, a continuously variable transmission mechanism, a gear power transmission mechanism having at least one gear ratio, and a clutch mechanism configured to selectively switch between a first transmission path through which the torque transmitted to the input shaft is transmitted to the output shaft via the continuously variable transmission mechanism, and a second transmission path through which the torque transmitted to the input shaft is transmitted to the output shaft via the gear power transmission mechanism. The control device includes an electronic control unit. The electronic control unit is configured as follows. That is, (i) the electronic control unit selectively switches between the first transmission path and the second transmission path in accordance with a traveling state of a vehicle. (ii) The electronic control unit calculates a target input shaft rotational speed, the target input shaft rotational speed being restricted in a range between an upper limit guard value of a rotational speed of the input shaft in the gear power transmission mechanism and a lower limit guard value of the rotational speed of the input shaft in the continuously variable transmission mechanism. (iii) The electronic control unit calculates a switching target input shaft rotational speed and a continuously variable transmission target primary rotational speed, the switching target input shaft rotational speed being for switching between the first transmission path and the second transmission path and the continuously variable transmission target primary rotational speed being for controlling a shift ratio of the continuously variable transmission mechanism based on the target input shaft rotational speed.

With the control device for the vehicle drive system, the target input shaft rotational speed that is restricted in a range between the upper limit guard value of the rotational speed of the input shaft in the gear power transmission mechanism and the lower limit guard value of the rotational speed of the input shaft in the continuously variable transmission mechanism is calculated. The switching target input shaft rotational speed for switching between the first transmission path and the second transmission path and the continuously variable transmission target primary rotational speed for controlling the shift ratio of the continuously variable transmission mechanism are calculated based on the target input shaft rotational speed. Thus, since the switching target input shaft rotational speed and the continuously variable transmission target primary rotational speed are calculated based on the target input shaft rotational speed restricted in a range of the lower limit guard value to the upper limit guard value, the difference between the switching target input shaft rotational speed and the continuously variable transmission target primary rotational speed is suitably decreased. When switching is made between the first transmission path and the second transmission path, the difference between the actual rotational speed of the input shaft at the switching start time point and the actual rotational speed of the input shaft at the switching completion time point is reduced.

In the control device according to the aspect of the present disclosure, the electronic control unit may be configured as follows. That is, (i) the electronic control unit may calculate a base target input shaft rotational speed based on a vehicle speed and an accelerator operation amount from a relationship stored in advance. (ii) The electronic control unit may set the lower limit guard value as the target input shaft rotational speed when the base target input shaft rotational speed is lower than the lower limit guard value. (iii) The electronic control unit may set the upper limit guard value as the target input shaft rotational speed when the base target input shaft rotational speed is higher than the upper limit guard value. (iv) The electronic control unit may set the base target input shaft rotational speed as the target input shaft rotational speed when the base target input shaft rotational speed is greater than or equal to the lower limit guard value and less than or equal to the upper limit guard value.

With the control device, the base target input shaft rotational speed is calculated based on the vehicle speed and the accelerator operation amount from the relationship stored in advance. When the base target input shaft rotational speed is lower than the lower limit guard value, the lower limit guard value is set as the target input shaft rotational speed. When the base target input shaft rotational speed is higher than the upper limit guard value, the upper limit guard value is set as the target input shaft rotational speed. When the base target input shaft rotational speed is greater than or equal to the lower limit guard value and less than or equal to the upper limit guard value, the base target input shaft rotational speed is set as the target input shaft rotational speed. Thus, the target input shaft rotational speed is restricted in a range of the lower limit guard value to the upper limit guard value.

In the control device according to the aspect of the present disclosure, the continuously variable transmission target primary rotational speed may be the target input shaft rotational speed.

With the control device, the continuously variable transmission target primary rotational speed is the target input shaft rotational speed. Thus, the continuously variable transmission target primary rotational speed can be easily calculated from the target input shaft rotational speed.

In the control device according to the aspect of the present disclosure, the switching target input shaft rotational speed may be an upshift target input shaft rotational speed for switching a torque transmission path from the second transmission path to the first transmission path. The electronic control unit may be configured to perform an upshift when the actual rotational speed of the input shaft exceeds the upshift target input shaft rotational speed.

With the control device, the switching target input shaft rotational speed is the upshift target input shaft rotational speed for switching the torque transmission path from the second transmission path to the first transmission path. The upshift is performed when the actual rotational speed of the input shaft exceeds the upshift target input shaft rotational speed. Thus, when the torque transmission path is switched from the second transmission path to the first transmission path, the difference between the actual rotational speed of the input shaft at the switching start time point and the actual rotational speed of the input shaft at the switching completion time point is reduced.

In the control device according to the aspect of the present disclosure, the upshift target input shaft rotational speed may be the target input shaft rotational speed.

With the control device, the upshift target input shaft rotational speed is the target input shaft rotational speed. Thus, the upshift target input shaft rotational speed can be easily calculated from the target input shaft rotational speed.

In the control device according to the aspect of the present disclosure, the switching target input shaft rotational speed may be a downshift target input shaft rotational speed for switching a torque transmission path from the first transmission path to the second transmission path. The electronic control unit may be configured as follows. That is, (i) the electronic control unit may perform a downshift when a downshift input shaft rotational speed acquired by an actual rotational speed of the output shaft from a downshift input shaft rotational speed calculation line stored in advance is less than or equal to the downshift target input shaft rotational speed. (ii) The electronic control unit may allow an accelerator to be stepped on to increase the base target input shaft rotational speed above the upper limit guard value. (iii) When the downshift input shaft rotational speed is less than the downshift target input shaft rotational speed, the electronic control unit may prohibit switching of a torque transmission path from the first transmission path to the second transmission path.

With the control device, the switching target input shaft rotational speed is the downshift target input shaft rotational speed for switching the torque transmission path from the first transmission path to the second transmission path. The downshift is performed when the downshift input shaft rotational speed acquired by the actual rotational speed of the output shaft from the downshift input shaft rotational speed calculation line stored in advance is less than or equal to the downshift target input shaft rotational speed. When the accelerator is stepped on to increase the base target input shaft rotational speed above the upper limit guard value, and the downshift input shaft rotational speed is less than the downshift target input shaft rotational speed, switching of the torque transmission path from the first transmission path to the second transmission path is prohibited. Thus, while the base target input shaft rotational speed corresponding to the accelerator operation amount is calculated when the accelerator is stepped on to increase the base target input shaft rotational speed above the upper limit guard value, the downshift target input shaft rotational speed is decreased below the downshift input shaft rotational speed since the downshift target input shaft rotational speed is restricted by the upper limit guard value. Accordingly, even when the accelerator is stepped on to increase the base target input shaft rotational speed above the upper limit guard value, the torque transmission path is not switched from the first transmission path to the second transmission path. Thus, a change in the behavior of the rotational speed of the input shaft can be suitably reduced.

In the control device according to the aspect of the present disclosure, the downshift target input shaft rotational speed may be the target input shaft rotational speed.

With the control device, the downshift target input shaft rotational speed is the target input shaft rotational speed. Thus, the downshift target input shaft rotational speed can be easily calculated from the target input shaft rotational speed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a diagram describing an electronic control unit of a vehicle drive system of a second embodiment of the present disclosure.

DETAILED DESCRIPTION OF EMBODIMENTS

Hereinafter, embodiments of the present disclosure will be described in detail with reference to the drawings.

Figure 1:
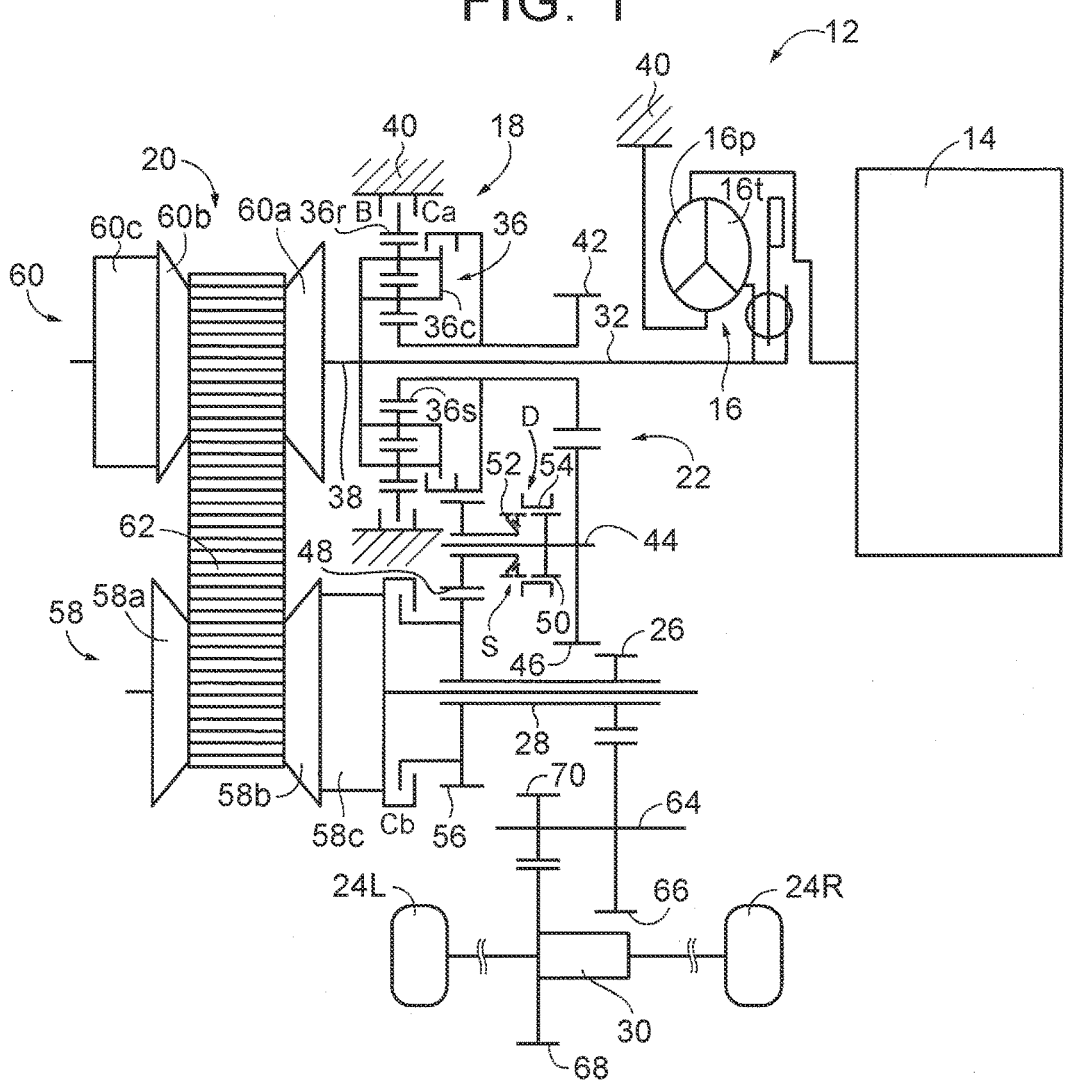
FIG. 1 is a skeletal diagram describing a schematic configuration of a vehicle drive system that is a first embodiment as one example of the present disclosure.

FIG. 1 is a skeletal diagram for describing a schematic configuration of a vehicle drive system 12 (hereinafter, referred to as the drive system 12) that is a first embodiment as one example of the present disclosure. The drive system 12 includes, for example, an engine (drive power source) 14 used as a drive power source for traveling, a torque converter 16 as a hydraulic power transmission device, a forward and reverse traveling switching device 18, a belt continuously variable transmission mechanism 20, a gear power transmission mechanism 22, an output shaft 28 integrated with an output gear 26 connected to drive wheels 24L, 24R in a manner capable of transmitting power to the drive wheels 24L, 24R, and a differential gear 30. The output shaft 28 is connected to the drive wheels 24L, 24R in a manner capable of transmitting (outputting) torque transmitted to the output shaft 28 as power to the drive wheels 24L, 24R. The drive system 12 includes the continuously variable transmission mechanism 20 and the gear power transmission mechanism 22 in parallel between a turbine shaft (input shaft) 32 and the output shaft 28. Accordingly, the drive system 12 transmits torque output from the engine 14 to the turbine shaft 32 via the torque converter 16. A first transmission path through which the torque transmitted to the turbine shaft 32 is transmitted to the output shaft 28 from the turbine shaft 32 through the continuously variable transmission mechanism 20, and a second transmission path through which the torque transmitted to the turbine shaft 32 is transmitted to the output shaft 28 from the turbine shaft 32 through the gear power transmission mechanism 22 are formed in the drive system 12. The drive system 12 includes an electronic control device (electronic control unit) 34 (refer to FIG. 3) described below. In the drive system 12, the electronic control unit selectively switches a torque transmission path through which the torque transmitted to the turbine shaft 32 is transmitted to the output shaft 28, between the first transmission path and the second transmission path in accordance with a traveling state of a vehicle.

The torque converter 16 includes a pump impeller $16p$ connected to a crankshaft of the engine 14 and a turbine impeller $16t$ that corresponds to an output side member of the torque converter 16 and is connected to the forward and reverse traveling switching device 18 through the turbine shaft 32. The torque converter 16 transmits power through fluid.

The forward and reverse traveling switching device 18 includes a forward traveling clutch Ca, a reverse traveling brake B, and a double pinion planetary gear device 36. A carrier $36c$ is integrally connected with the turbine shaft 32 of the torque converter 16 and a primary shaft 38 of the continuously variable transmission mechanism 20. A ring gear $36r$ is selectively connected to a housing 40 as a non-rotating member through the reverse traveling brake B. A sun gear $36s$ is connected to a small diameter gear 42. The sun gear $36s$ and the carrier $36c$ are selectively connected to each other through the forward traveling clutch Ca. The forward traveling clutch Ca and the reverse traveling brake B correspond to a connection and disconnection device. Any of the forward traveling clutch Ca and the reverse traveling brake B is a hydraulic pressure friction engaging device that is engaged by friction by a hydraulic pressure actuator.

The sun gear $36s$ of the planetary gear device 36 is connected to the small diameter gear 42 that constitutes the gear power transmission mechanism 22. The gear power transmission mechanism 22 includes the small diameter gear 42 and a large diameter gear 46 that is disposed to be non-rotatable relative to a first counter shaft 44. The gear power transmission mechanism 22 has one gear ratio, that is, an EL gear ratio $\gamma_{EL}$. An idler gear 48 is disposed to be rotatable relative to the first counter shaft 44 about the same rotation axis as the first counter shaft 44. A meshing clutch D that selectively connects and disconnects the first counter shaft 44 with the idler gear 48 is disposed between the first counter shaft 44 and the idler gear 48. The meshing clutch D includes a first gear 50 formed in the first counter shaft 44, a second gear 52 formed in the idler gear 48, and a hub sleeve 54 in which spline teeth capable of fitting (engaging or meshing) with the first gear 50 and the second gear 52 are formed. The hub sleeve 54 fitting with the first gear 50 and the second gear 52 connects the first counter shaft 44 with the idler gear 48 in a manner capable of transmitting power therebetween. The meshing clutch D further includes a synchromesh mechanism S as a synchronization mechanism that synchronizes rotation when the meshing clutch D fits with the first gear 50 and the second gear 52.

The idler gear 48 meshes with an input gear 56 that has a larger diameter than the idler gear 48. The input gear 56 is disposed to be non-rotatable relative to the output shaft 28 that is disposed on the same rotation axis as a secondary pulley 58 of the continuously variable transmission mechanism 20. The output shaft 28 is disposed to be rotatable about the rotation axis of the secondary pulley 58. The input gear 56 and the output gear 26 are disposed to be non-rotatable relative to each other. The forward traveling clutch Ca, the reverse traveling brake B, and the meshing clutch D are interposed on the second transmission path through which the torque of the engine 14 is transmitted to the output shaft 28 from the turbine shaft 32 via the gear power transmission mechanism 22.

The continuously variable transmission mechanism 20 includes a primary pulley (pulley) 60, the secondary pulley (pulley) 58, and a power transmission belt 62. The pulley 60 has a variable effective diameter and is an input side member that is connected to the turbine shaft 32 through the primary shaft 38 and is disposed on the torque transmission path between the turbine shaft 32 functioning as an input shaft and the output shaft 28. The pulley 58 has a variable effective diameter and is an output side member connected to the output shaft 28 through a belt traveling clutch Cb described below. The power transmission belt 62 is wound between the pulleys 58, 60. Power is transmitted through a friction force between the pulleys 58, 60 and the power transmission belt 62.

As illustrated in FIG. 1, the primary pulley 60 includes a fixed sheave 60a, a movable sheave 60b, and a primary side hydraulic pressure actuator 60c. The fixed sheave 60a is an input side fixed rotating body fixed to the primary shaft 38. The movable sheave 60b is an input side movable rotating body that is disposed to be axially non-rotatable relative to the primary shaft 38 and movable in the axial direction. The primary side hydraulic pressure actuator 60c generates a propulsive force that moves the movable sheave 60b in order to change the width of a V groove between the fixed sheave 60a and the movable sheave 60b. The secondary pulley 58 includes a fixed sheave 58a, a movable sheave 58b, and a secondary side hydraulic pressure actuator 58c. The fixed sheave 58a is an output side fixed rotating body. The movable sheave 58b is an output side movable rotating body that is disposed to be axially non-rotatable relative to the fixed sheave 58a and movable in the axial direction. The secondary side hydraulic pressure actuator 58c generates a propulsive force that moves the movable sheave 58b in order to change the width of a V groove between the fixed sheave 58a and the movable sheave 58b.

When the actual diameter (effective diameter) of the power transmission belt 62 is changed by changing the width of the V groove of each of the primary pulley 60 and the secondary pulley 58, an actual shift ratio (gear ratio) $\gamma$(=primary rotational speed nin (rpm)/secondary rotational speed nss (rpm)) is continuously changed. For example, when the width of the V groove of the primary pulley 60 is decreased, the shift ratio $\gamma$ is decreased. That is, the continuously variable transmission mechanism 20 shifts up. When the width of the V groove of the primary pulley 60 is increased, the shift ratio $\gamma$ is increased. That is, the continuously variable transmission mechanism 20 shifts down.

As illustrated in FIG. 1, the belt traveling clutch Cb that selectively connects and disconnects the continuously variable transmission mechanism 20 and the output shaft 28 is interposed between the continuously variable transmission mechanism 20 and the output shaft 28. Engaging of the belt traveling clutch Cb forms the first transmission path through which the torque of the engine 14 is transmitted to the output shaft 28 via the turbine shaft 32 and the continuously variable transmission mechanism 20. When the belt traveling clutch Cb is released, the first transmission path is disconnected, and torque is not transmitted to the output shaft 28 through the continuously variable transmission mechanism 20.

As illustrated in FIG. 1, the output gear 26 meshes with a large diameter gear 66 that is fixed to a second counter shaft 64. A small diameter gear 70 that meshes with a differential ring gear 68 of the differential gear 30 configured with a differential mechanism is disposed in the second counter shaft 64.

Figure 2:
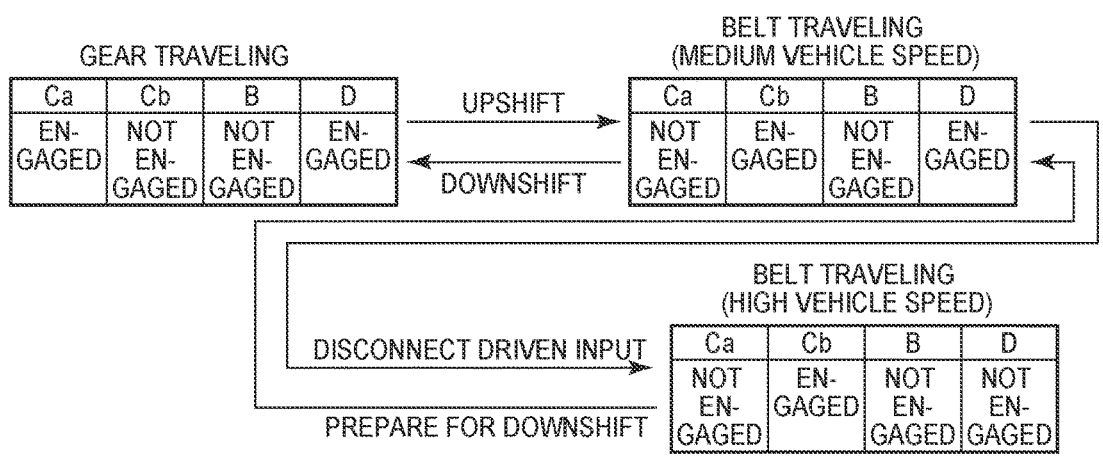
FIG. 2 is an engagement table of engaging elements of the vehicle drive system in FIG. 1 per traveling pattern.

Next, operation of the drive system 12 configured as above will be described by using an engagement table of engaging elements per traveling pattern illustrated in FIG. 2. In FIG. 2, "Ca" corresponds to an operating state of the forward traveling clutch Ca, and "Cb" corresponds to an operating state of the belt traveling clutch Cb. "B" corresponds to an operating state of the reverse traveling brake B, and "D" corresponds to an operating state of the meshing clutch D. Engagement (connection) is denoted by "engaged", and release (disconnection) is denoted by "not engaged". The meshing clutch D includes the synchromesh mechanism S. The synchromesh mechanism S operates when the meshing clutch D is engaged.

First, a traveling pattern in which the torque of the engine 14 is transmitted to the output shaft 28 through (via) the continuously variable transmission mechanism 20 will be described. The traveling pattern corresponds to belt traveling (high vehicle speed) in FIG. 2. As illustrated in the belt traveling in FIG. 2, the belt traveling clutch Cb is connected, and the forward traveling clutch Ca, the reverse traveling brake B, and the meshing clutch D are disconnected. The connection of the belt traveling clutch Cb connects the secondary pulley 58 with the output shaft 28 in a manner capable of transmitting power therebetween. Thus, the secondary pulley 58, the output shaft 28, and the output gear 26 rotate as a single body. Accordingly, when the belt traveling clutch Cb is connected, the first transmission path is formed, and the torque of the engine 14 is transmitted to the output shaft 28 and the output gear 26 via the torque converter 16, the turbine shaft 32, the primary shaft 38, and the continuously variable transmission mechanism 20.

Next, a traveling pattern in which the torque of the engine 14 is transmitted to the output shaft 28 via the gear power transmission mechanism 22, that is, a traveling pattern in which the torque is transmitted through the second transmission path, will be described. The traveling pattern corresponds to gear traveling in FIG. 2. As illustrated in FIG. 2, the forward traveling clutch Ca and the meshing clutch D are engaged (connected), and the belt traveling clutch Cb and the reverse traveling brake B are released (disconnected).

The engagement of the forward traveling clutch Ca causes the planetary gear device 36 constituting the forward and reverse traveling switching device 18 to rotate as a single body. Thus, the small diameter gear 42 rotates at the same rotational speed as the turbine shaft 32. The engagement of the meshing clutch D connects the first counter shaft 44 with the idler gear 48 in a manner capable of transmitting power therebetween, and the first counter shaft 44 and the idler gear 48 rotate as a single body. Accordingly, the engagement of the forward traveling clutch Ca and the meshing clutch D forms the second transmission path, and the power of the engine 14 is transmitted to the output shaft 28 and the output gear 26 via the torque converter 16, the turbine shaft 32, the forward and reverse traveling switching device 18, the gear power transmission mechanism 22, the idler gear 48, and the input gear 56.

The gear traveling is selected in a low vehicle speed region. The EL gear ratio $\gamma_{EL}$ (turbine rotational speed nt of turbine shaft 32 (rpm)/output shaft rotational speed no of output shaft 28 (rpm)) based on the second transmission path is set to a value greater than a maximum shift ratio $\gamma$max of the continuously variable transmission mechanism 20 (refer to FIG. 4 and FIG. 5). For example, when a vehicle speed V (km/h) rises and enters a predefined belt traveling region in which the belt traveling is executed, the gear traveling is switched to the belt traveling. When switching is made from the gear traveling to the belt traveling (high vehicle speed) or from the belt traveling (high vehicle speed) to the gear traveling, switching is transitionally made via belt traveling (medium vehicle speed) in FIG. 2.

For example, when switching is made from the gear traveling to the belt traveling (high vehicle speed), switching is transitionally made from a state of engagement of the forward traveling clutch Ca and the meshing clutch D corresponding to the gear traveling to a state of engagement of the belt traveling clutch Cb and the meshing clutch D corresponding to the belt traveling (medium vehicle speed). That is, re-engagement (clutch-to-clutch shifting) that releases the forward traveling clutch Ca and engages the belt traveling clutch Cb is started. The torque transmission path is switched from the second transmission path to the first transmission path, and an upshift is actually made in the drive system 12. After the torque transmission path is switched, the meshing clutch D is released (disconnected) in order to prevent an unneeded drag or an increase in the rotational speed of the gear power transmission mechanism 22 or the like.

When switching is made from the belt traveling (high vehicle speed) to the gear traveling, switching is transitionally made from a state of engagement of the belt traveling clutch Cb to a state of engagement of the meshing clutch D as a preparation for switching to the gear traveling ("downshift preparation" illustrated in FIG. 2). Rotation is transmitted to the sun gear 36s of the planetary gear device 36 via the gear power transmission mechanism 22. In the state, re-engagement (clutch-to-clutch shifting) that engages the forward traveling clutch Ca and releases the belt traveling clutch Cb is executed, and the torque transmission path is switched from the first transmission path to the second transmission path. A downshift is actually made in the drive system 12. As described above, the re-engagement (clutch-to-clutch shifting) that releases the forward traveling clutch Ca and engages the belt traveling clutch Cb switches the torque transmission path from the second transmission path to the first transmission path. The re-engagement (clutch-to-clutch shifting) that engages the forward traveling clutch Ca and releases the belt traveling clutch Cb switches the torque transmission path from the first transmission path to the second transmission path. Thus, the forward traveling clutch Ca and the belt traveling clutch Cb function as a clutch mechanism that selectively switches the torque transmission path between the first transmission path and the second transmission path.

Figure 3:
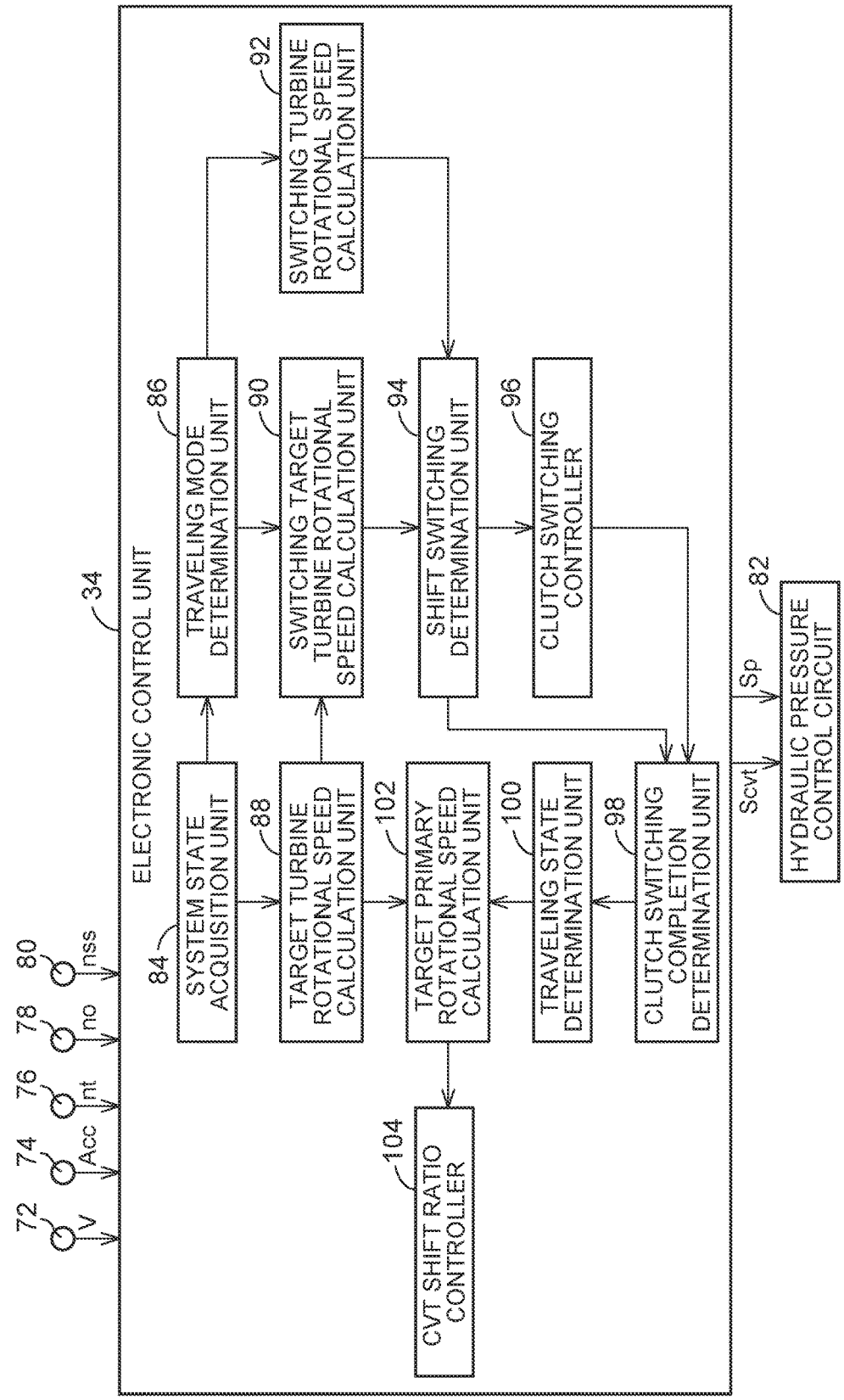
FIG. 3 is a functional block diagram describing main portions for control functions of an electronic control unit disposed in the vehicle drive system in FIG. 1.

FIG. 3 is a functional block diagram that describes an input and output system of the electronic control unit 34 provided for controlling, for example, the continuously variable transmission mechanism 20 and the clutch mechanism including the forward traveling clutch Ca and the belt traveling clutch Cb, and describes main portions of control functions of the electronic control unit 34. The electronic control unit 34 is configured to include a so-called microcomputer that includes, for example, a CPU, a RAM, a ROM, and input and output interfaces. The CPU executes various control processes for the drive system 12 by performing signal processing in accordance with a program stored in advance in the ROM and using a temporary storage function of the RAM. For example, the electronic control unit 34 executes a control process that appropriately switches the torque transmission path of the drive system 12 to any of the first transmission path and the second transmission path, that is, a control process that appropriately switches to any of the gear traveling and the belt traveling, or a shift ratio control process for the continuously variable transmission mechanism 20.

The electronic control unit 34 is supplied with a signal representing the vehicle speed V (km/h) detected by a vehicle speed sensor 72, a signal representing an accelerator operation amount Acc (%) that is the amount of operation of an accelerator pedal as a needed acceleration amount of a driver detected by an accelerator operation amount sensor 74, a signal representing the turbine rotational speed nt (rpm) of the turbine shaft 32 detected by a turbine rotational speed sensor 76, a signal representing the output shaft rotational speed no (rpm) of the output shaft 28 detected by an output shaft rotational speed sensor 78, a signal representing the secondary rotational speed nss (rpm) of the secondary pulley 58 detected by a secondary rotational speed sensor 80, and the like.

The electronic control unit 34 outputs a hydraulic pressure control instruction signal Sp that drives each linear solenoid valve controlling hydraulic pressure supplied to the forward traveling clutch Ca, the reverse traveling brake B, the belt traveling clutch Cb, and the meshing clutch D related to switching of the torque transmission path of the drive system 12, a hydraulic pressure control instruction signal Scvt that drives each linear solenoid valve controlling hydraulic pressure supplied to the primary side hydraulic pressure actuator 60c and the secondary side hydraulic pressure actuator 58c controlling the shift ratio $\gamma$ of the continuously variable transmission mechanism 20, and the like to a hydraulic pressure control circuit 82.

The electronic control unit 34 illustrated in FIG. 3 includes, as main portions of control functions, a system state acquisition unit 84, a traveling mode determination unit 86, a target turbine rotational speed calculation unit 88, a switching target turbine rotational speed calculation unit 90, a switching turbine rotational speed calculation unit 92, a shift switching determination unit 94, a clutch switching controller 96, a clutch switching completion determination unit 98, a traveling state determination unit 100, a target primary rotational speed calculation unit 102, a CVT shift ratio controller 104, and the like.

The system state acquisition unit 84 illustrated in FIG. 3 acquires (reads) a system state that is stored in a storage unit, not illustrated, of the electronic control unit 34.

The system state includes, for example, a traveling mode in traveling, an upper limit guard value Gmax (refer to FIG.

Figure 5:
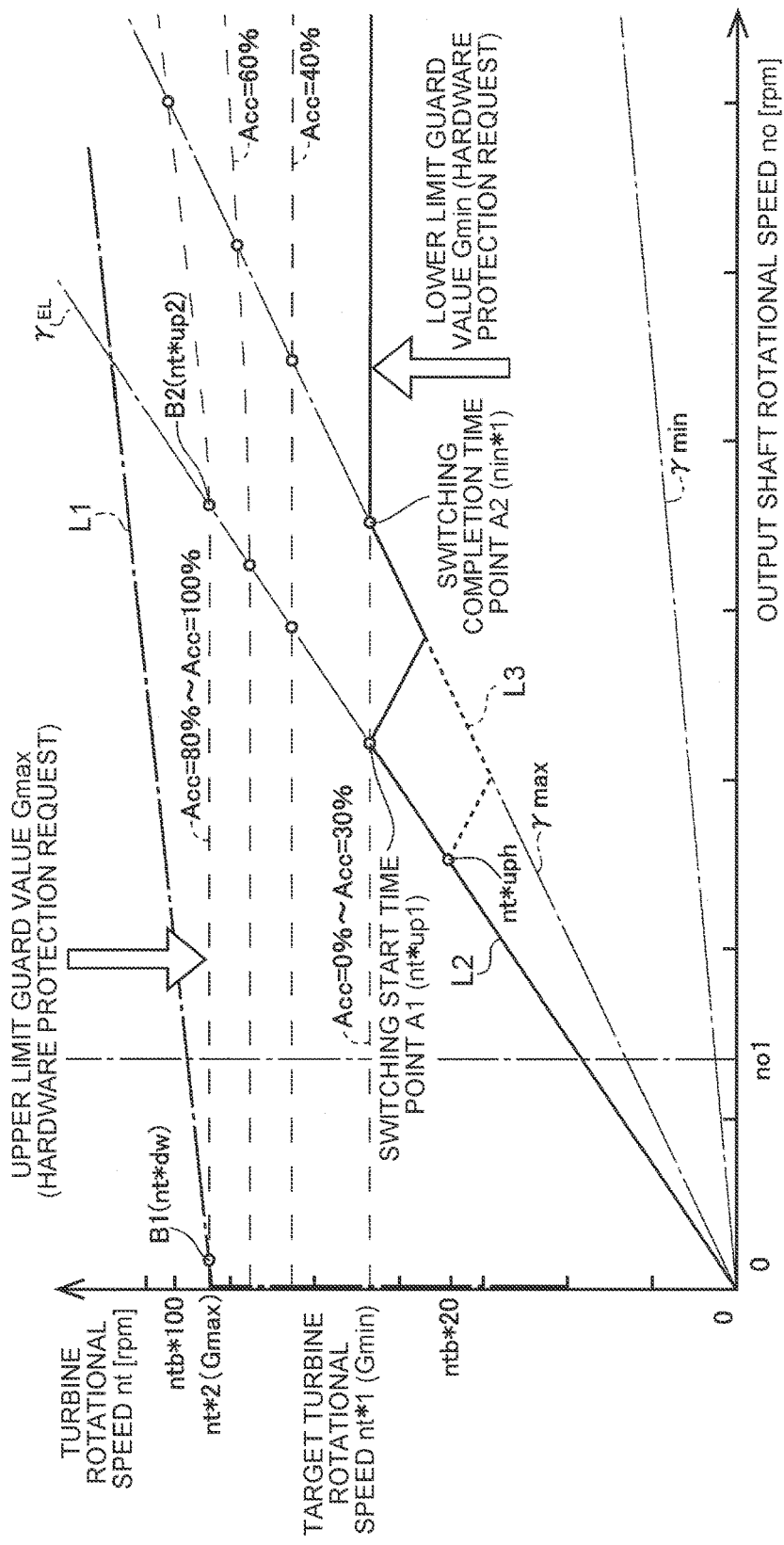
FIG. 5 is a diagram illustrating the upshift target turbine rotational speed and the downshift target turbine rotational speed for switching between the first transmission path and the second transmission path, and the target primary rotational speed for controlling the shift ratio of the continuously variable transmission mechanism when the upper limit guard value and the lower limit guard value are set during traveling of the vehicle in the vehicle drive system.

5), and a lower limit guard value Gmin (refer to FIG. 5). When the vehicle starts traveling, the traveling mode is set to a gear traveling mode in which the gear traveling illustrated in FIG. 2 is executed. The upper limit guard value Gmax (rpm) is the upper limit value of the turbine rotational speed nt (rpm) that is provided in order to prevent, for example, an increase in the rotational speed of the gears (the small diameter gear 42 and the large diameter gear 46) of the gear power transmission mechanism 22, that is, an increase in the rotational speed of the pinion of the planetary gear device 36, in the gear traveling illustrated in FIG. 2, that is, when the second transmission path is selected by a protection request for hardware such as a pinion in the gear power transmission mechanism 22 from excessive rotation or the like. The lower limit guard value Gmin (rpm) is the lower limit value of the turbine rotational speed nt (rpm) that is provided in order to prevent a slip between, for example, the primary pulley 60 or the secondary pulley 58 and the power transmission belt 62 in the belt traveling illustrated in FIG. 2, that is, when the first transmission path is selected by a protection request for hardware such as the continuously variable transmission mechanism 20. The upper limit guard value Gmax and the lower limit guard value Gmin are changed according to the vehicle traveling state such as the output torque output from the engine 14.

When the system state acquisition unit 84 acquires the system state, that is, the current traveling mode, the traveling mode determination unit 86 in FIG. 3 determines, from the traveling mode acquired in the system state acquisition unit 84, whether the traveling mode selected by the electronic control unit 34 during traveling of the vehicle is the gear traveling mode in which the gear traveling illustrated in FIG. 2 is executed, or a belt traveling mode in which the belt traveling illustrated in FIG. 2 is executed.

When the system state acquisition unit 84 acquires the system state, that is, the upper limit guard value Gmax (rpm) and the lower limit guard value Gmin (rpm), the target turbine rotational speed calculation unit 88 in FIG. 3 calculates a base target turbine rotational speed ntb* (rpm) based on the actual output shaft rotational speed no and the actual accelerator operation amount Acc, from a relationship map (refer to FIG. 4) in which a relationship between the vehicle speed V, that is, the output shaft rotational speed no, and a base target turbine rotational speed (base target input shaft rotational speed) ntb* for calculating a target turbine rotational speed (target input shaft rotational speed) nt* for controlling the shift ratio of the continuously variable transmission mechanism 20 is set in advance and stored with, for example, the acceleration operation amount Acc as a parameter. The target turbine rotational speed calculation unit 88 calculates the target turbine rotational speed (target input shaft rotational speed) nt* (rpm) restricted within a range of the upper limit guard value Gmax to the lower limit guard value Gmin from the calculated base target turbine rotational speed ntb*.

Figure 4:
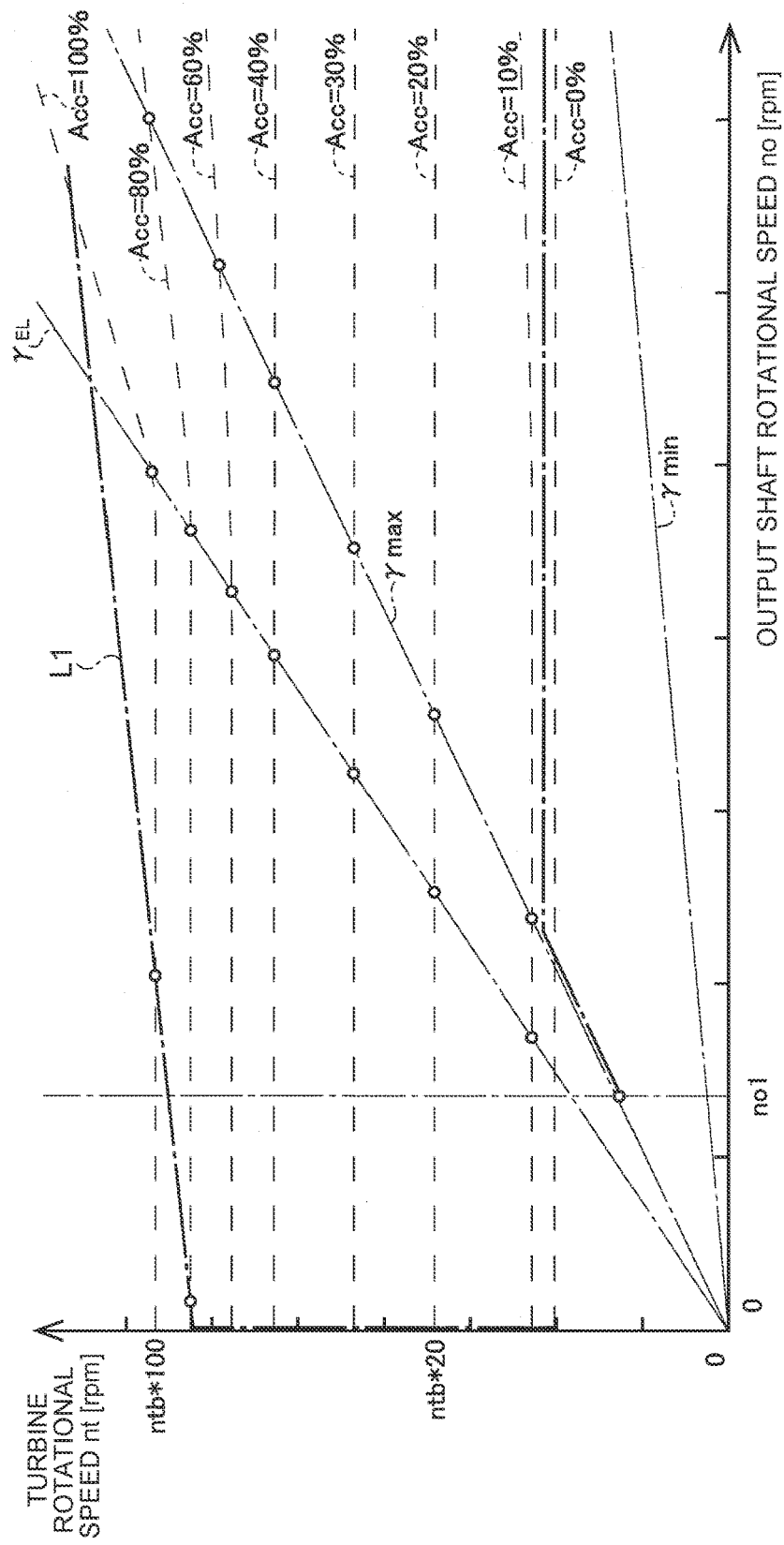
FIG. 4 is a diagram illustrating an upshift target turbine rotational speed and a downshift target turbine rotational speed for switching between a first transmission path and a second transmission path, and a target primary rotational speed for controlling the shift ratio of a continuously variable transmission mechanism when an upper limit guard value and a lower limit guard value are not set during traveling of a vehicle in the vehicle drive system.

For example, as illustrated in FIG. 5, when the base target turbine rotational speed ntb* (rpm) calculated by the actual output shaft rotational speed no and the actual accelerator operation amount Acc from the relationship map in FIG. 4 is lower than the lower limit guard value Gmin (rpm) with the accelerator operation amount Acc lower than, for example, 30%, that is, when the base target turbine rotational speed ntb* (rpm) is lower than the lower limit guard value Gmin (rpm), the lower limit guard value Gmin is set as the target turbine rotational speed nt* in the target turbine rotational speed calculation unit 88. As illustrated in FIG. 5, when the base target turbine rotational speed ntb* (rpm) calculated by the actual output shaft rotational speed no and the actual accelerator operation amount Acc from the relationship map in FIG. 4 is higher than the upper limit guard value Gmax (rpm) with the accelerator operation amount Acc higher than, for example, 80%, that is, when the base target turbine rotational speed ntb* (rpm) is higher than the upper limit guard value Gmax (rpm), the upper limit value Gmax is set as the target turbine rotational speed nt* in the target turbine rotational speed calculation unit 88. As illustrated in FIG. 5, when the base target turbine rotational speed ntb* (rpm) calculated by the actual output shaft rotational speed no and the actual accelerator operation amount Acc from the relationship map in FIG. 4 is greater than or equal to the lower limit guard value Gmin (rpm) and less than or equal to the upper limit guard value Gmax (rpm) with the accelerator operation amount Acc in a range of, for example, 30% to 80%, that is, when the base target turbine rotational speed ntb* (rpm) is greater than or equal to the lower limit guard value Gmin (rpm) and less than or equal to the upper limit guard value Gmax (rpm), the base target turbine rotational speed ntb* is set as the target turbine rotational speed nt* in the target turbine rotational speed calculation unit 88. When the system state acquisition unit 84 does not acquire the system state, that is, the upper limit guard value Gmax and the lower limit guard value Gmin, the calculated base target turbine rotational speed ntb* is set as the target turbine rotational speed nt* in the target turbine rotational speed calculation unit 88.

When the traveling mode determination unit 86 determines the traveling mode, and the target turbine rotational speed calculation unit 88 calculates the target turbine rotational speed nt*, the switching target turbine rotational speed calculation unit 90 in FIG. 3 calculates a switching target turbine rotational speed (switching target input shaft rotational speed) for switching between the first transmission path and the second transmission path, that is, an upshift target turbine rotational speed (upshift target input shaft rotational speed) nt*up (rpm) or a downshift target turbine rotational speed (downshift target input shaft rotational speed) nt*dw (rpm) described below, based on the target turbine rotational speed nt* calculated by the target turbine rotational speed calculation unit 88. For example, when the traveling mode determination unit 86 determines that the traveling mode is the gear traveling mode, the switching target turbine rotational speed calculation unit 90 calculates, based on the target turbine rotational speed nt*, the upshift target turbine rotational speed nt*up for an upshift that switches the torque transmission path from the second transmission path to the first transmission path. That is, the switching target turbine rotational speed calculation unit 90 sets the target turbine rotational speed nt* calculated by the target turbine rotational speed calculation unit 88 to the upshift target turbine rotational speed nt*up (nt*=nt*up). When the traveling mode determination unit 86 determines that the traveling mode is the belt traveling mode, the switching target turbine rotational speed calculation unit 90 calculates, based on the target turbine rotational speed nt*, the downshift target turbine rotational speed nt*dw for a downshift that switches the torque transmission path from the first transmission path to the second transmission path. That is, the switching target turbine rotational speed calculation unit 90 sets the target turbine rotational speed nt* calculated by the target turbine rotational speed calculation unit 88 to the downshift target turbine rotational speed nt*dw (nt*=nt*dw).

When the traveling mode determination unit 86 determines that the traveling mode is the gear traveling mode, the switching turbine rotational speed calculation unit 92 in FIG. 3 calculates an upshift turbine rotational speed (upshift input shaft rotational speed) ntup (rpm) for use in determination of the upshift. When the traveling mode determination unit 86 determines that the traveling mode is the belt traveling mode, the switching turbine rotational speed calculation unit 92 calculates a downshift turbine rotational speed (downshift input shaft rotational speed) ntdw (rpm) for use in determination of the downshift. For example, when the traveling mode determination unit 86 determines that the traveling mode is the gear traveling mode, the switching turbine rotational speed calculation unit 92 calculates the upshift turbine rotational speed ntup (rpm) by multiplying the actual output shaft rotational speed no of the output shaft 28 by the EL gear ratio $\gamma_{EL}$ of the gear power transmission mechanism 22 (ntup=no×$\gamma_{EL}$). When the traveling mode determination unit 86 determines that the traveling mode is the belt traveling mode, the switching turbine rotational speed calculation unit 92 calculates the downshift turbine rotational speed ntdw (rpm) by the actual output shaft rotational speed no (rpm) of the output shaft 28 from, for example, a power ON downshift turbine rotational speed calculation line (downshift input shaft rotational speed calculation line) L1 (refer to FIG. 4 and FIG. 5) that is stored in advance in a diagram having a vertical axis denoting the turbine rotational speed nt (rpm) and a horizontal axis denoting the output shaft rotational speed no (rpm).

When the traveling mode determination unit 86 determines the traveling mode, and the switching target turbine rotational speed calculation unit 90 calculates the upshift target turbine rotational speed nt*up or the downshift target turbine rotational speed nt*dw, and the switching turbine rotational speed calculation unit 92 calculates the upshift turbine rotational speed ntup or the downshift turbine rotational speed ntdw, the shift switching determination unit 94 in FIG. 3 determines whether to switch to the first transmission path or the second transmission path.

For example, when the traveling mode determination unit 86 determines that the traveling mode is the gear traveling mode, and the switching target turbine rotational speed calculation unit 90 calculates the upshift target turbine rotational speed nt*up (rpm), and the switching turbine rotational speed calculation unit 92 calculates the upshift turbine rotational speed ntup (rpm), the shift switching determination unit 94 determines, by using the calculated upshift target turbine rotational speed nt*up (rpm) and the upshift turbine rotational speed ntup (rpm), whether or not to perform the upshift which switches the torque transmission path from the second transmission path to the first transmission path. The shift switching determination unit 94 performs the upshift when the upshift turbine rotational speed ntup (rpm) calculated by the switching turbine rotational speed calculation unit 92 exceeds the upshift target turbine rotational speed nt*up (rpm) calculated by the switching target turbine rotational speed calculation unit 90 (nt*up<ntup). When the shift switching determination unit 94 performs the upshift, the shift switching determination unit 94 changes the system state, that is, the traveling mode, acquired by the system state acquisition unit 84 to the belt traveling mode (traveling mode=belt traveling mode).

For example, when the traveling mode determination unit 86 determines that the traveling mode is the belt traveling mode, and the switching target turbine rotational speed calculation unit 90 calculates the downshift target turbine rotational speed nt*dw (rpm), and the switching turbine rotational speed calculation unit 92 calculates the downshift turbine rotational speed ntdw (rpm), and, for example, power ON traveling in which the accelerator pedal is stepped on is performed, the shift switching determination unit 94 determines, by using the calculated downshift target turbine rotational speed nt*dw (rpm) and the downshift turbine rotational speed ntdw (rpm), whether or not to perform a power ON downshift that switches the torque transmission path from the first transmission path to the second transmission path. The shift switching determination unit 94 performs the power ON downshift when the downshift turbine rotational speed ntdw (rpm) calculated by the switching turbine rotational speed calculation unit 92 is less than or equal to the downshift target turbine rotational speed nt*dw (rpm) calculated by the switching target turbine rotational speed calculation unit 90 (nt*dw≥ntdw). When the shift switching determination unit 94 performs the power ON downshift, the shift switching determination unit 94 changes the system state, that is, the traveling mode, acquired by the system state acquisition unit 84 to the gear traveling mode (traveling mode=gear traveling mode).

For example, when the traveling mode determination unit 86 determines that the traveling mode is the belt traveling mode, and, for example, coast traveling in which the accelerator pedal is not stepped on is performed, the shift switching determination unit 94 performs a coast downshift that switches the torque transmission path from the first transmission path to the second transmission path, when the actual output shaft rotational speed no (rpm) of the output shaft 28 is less than or equal to a coast down rotational speed no1 (rpm) (refer to FIG. 4 and FIG. 5) set in advance (no1≥no). When the shift switching determination unit 94 performs the coast downshift, the shift switching determination unit 94 changes the system state, that is, the traveling mode, acquired by the system state acquisition unit 84 to the gear traveling mode (traveling mode=gear traveling mode).

When the shift switching determination unit 94 performs the upshift, the clutch switching controller 96 in FIG. 3 executes a clutch-to-clutch shift that releases the forward traveling clutch Ca and engages the belt traveling clutch Cb, and then releases the meshing clutch D. When the shift switching determination unit 94 performs the downshift, that is, the power ON downshift or the coast downshift, the clutch switching controller 96 first engages the meshing clutch D and then, executes a clutch-to-clutch shift that engages the forward traveling clutch Ca and releases the belt traveling clutch Cb.

When the shift switching determination unit 94 determines that the upshift is performed, and the clutch switching controller 96 executes a clutch-to-clutch shift, the clutch switching completion determination unit 98 in FIG. 3 determines whether or not the clutch-to-clutch shift executed by the clutch switching controller 96 is completed, that is, whether or not switching of the belt traveling clutch Cb from a released state to an engaged state is completed. For example, when the difference between the secondary rotational speed nss (rpm) and the output shaft rotational speed no (rpm) is less than a synchronization determination value that is set in advance, the clutch switching completion determination unit 98 determines that the clutch-to-clutch shift executed by the clutch switching controller 96 is completed.

When the shift switching determination unit 94 determines that the power ON downshift or the coast downshift is performed, and the clutch switching controller 96 executes a clutch-to-clutch shift, the clutch switching completion determination unit 98 determines whether or not the clutch-to-clutch shift executed by the clutch switching controller 96 is completed, that is, whether or not switching of the forward traveling clutch Ca from a released state to an engaged state is completed. For example, when the difference between the turbine rotational speed nt (rpm) and the rotational speed (rpm) of the small diameter gear 42 of the gear power transmission mechanism 22 is less than a predetermined value, the clutch switching completion determination unit 98 determines that the clutch-to-clutch shift executed by the clutch switching controller 96 is completed. The rotational speed (rpm) of the small diameter gear 42 of the gear power transmission mechanism 22 is calculated from the output shaft rotational speed no (rpm) by using the gear ratio γ of the input gear 56 and the idler gear 48 and the gear ratio γ of the large diameter gear 46 and the small diameter gear 42.

When the clutch switching completion determination unit 98 determines that the clutch-to-clutch shift is completed, the traveling state determination unit 100 in FIG. 3 determines whether the actual traveling state of the vehicle is the gear traveling or the belt traveling from the actual engaged state of a clutch such as the belt traveling clutch Cb. For example, when the traveling state determination unit 100 is supplied with the hydraulic pressure control instruction signal Sp that drives the linear solenoid valve controlling the hydraulic pressure supplied to the belt traveling clutch Cb, the traveling state determination unit 100 determines that the traveling state of the vehicle is the belt traveling. When the traveling state determination unit 100 is not supplied with the hydraulic pressure control instruction signal Sp, the traveling state determination unit 100 determines that the traveling state of the vehicle is the gear traveling.

When the traveling state determination unit 100 determines the traveling state of the vehicle, the target primary rotational speed calculation unit 102 in FIG. 3 calculates a target primary rotational speed (continuously variable transmission target primary rotational speed) nin* (rpm) for controlling the shift ratio of the continuously variable transmission mechanism 20. For example, when the traveling state determination unit 100 determines that the traveling state is the belt traveling, the target primary rotational speed calculation unit 102 sets the target turbine rotational speed nt* (rpm) calculated by the target turbine rotational speed calculation unit 88 to the target primary rotational speed nin* (rpm) (nin*=nt*). When the traveling state determination unit 100 determines that the traveling state is the gear traveling, the target primary rotational speed calculation unit 102 sets the target primary rotational speed nin* (rpm) to a γmax rotational speed nγmax (rpm) that is set in advance to cause the shift ratio γ of the continuously variable transmission mechanism 20 to have the maximum shift ratio γmax (nin*=nγmax).

When the target primary rotational speed calculation unit 102 calculates the target primary rotational speed nin* (rpm), the CVT shift ratio controller 104 in FIG. 3 calculates a target shift ratio γ* described below based on the target primary rotational speed nin* (rpm) calculated by the target primary rotational speed calculation unit 102, and outputs the hydraulic pressure control instruction signal Scvt to the hydraulic pressure control circuit 82. The hydraulic pressure control instruction signal Scvt controls the shift ratio γ of the continuously variable transmission mechanism 20 such that the shift ratio γ has the calculated target shift ratio γ*. When the target primary rotational speed calculation unit 102 calculates the target primary rotational speed nin* (rpm), the CVT shift ratio controller 104 calculates the target shift ratio γ* from the ratio of the calculated target primary rotational speed nin* (rpm) and the secondary rotational speed nss (rpm) detected from the secondary rotational speed sensor 80.

Figure 6:
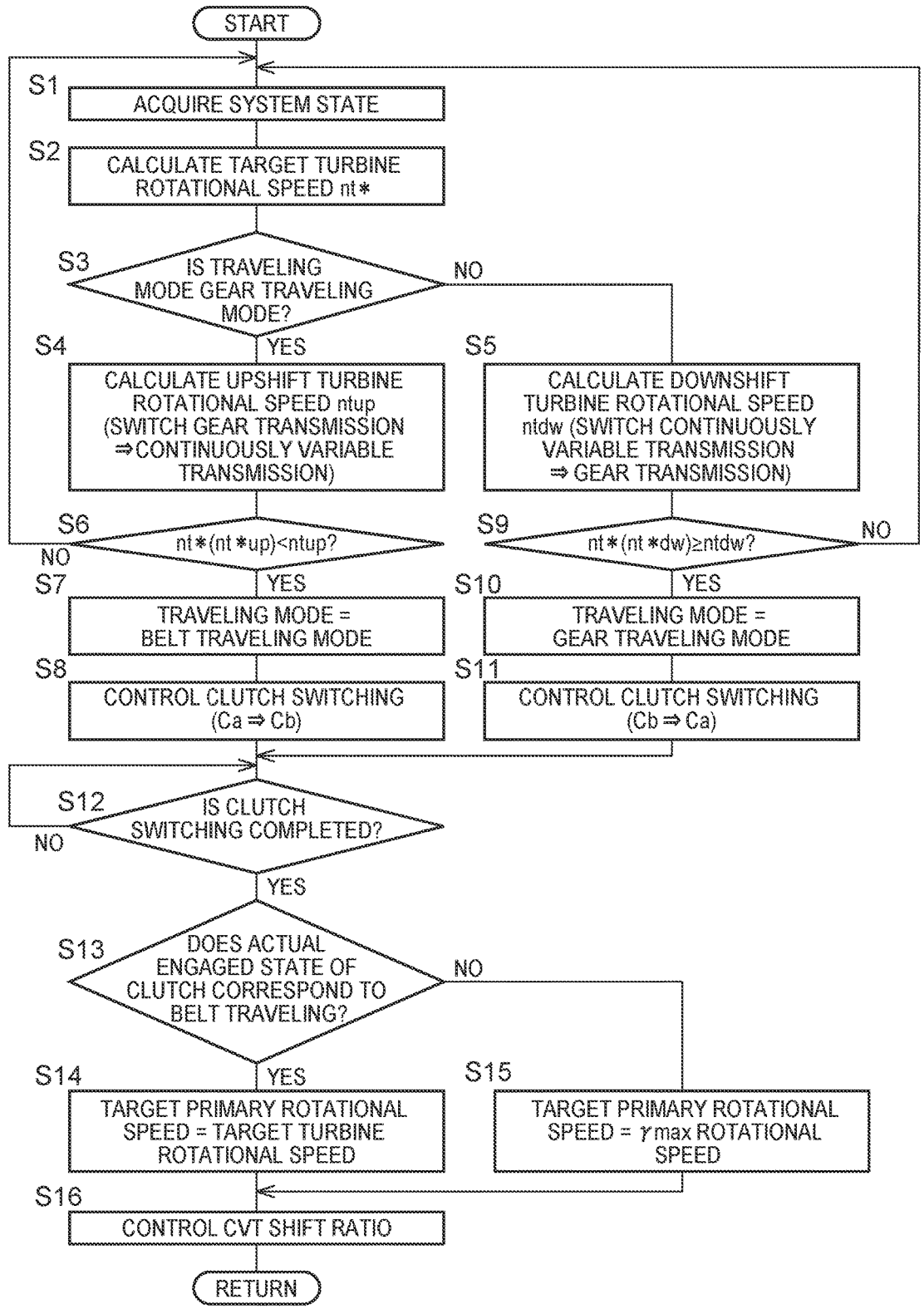
FIG. 6 is a flowchart describing the first embodiment and is a flowchart describing one example of a control operation in an electronic control unit in FIG. 3 for a switching control process that selectively switches between the first transmission path and the second transmission path during traveling of the vehicle, that is, a switching control process that switches from gear traveling to belt traveling or from belt traveling to gear traveling, and a shift ratio control process in the continuously variable transmission mechanism.

FIG. 6 is a flowchart describing one example of a control operation in the electronic control unit 34 for a switching control process that selectively switches between the first transmission path and the second transmission path during traveling of the vehicle, that is, a switching control process that switches from the gear traveling to the belt traveling or from the belt traveling to the gear traveling, and a shift ratio control process in the continuously variable transmission mechanism 20.

First, in step (hereinafter, "step" will be omitted) S1 corresponding to the function of the system state acquisition unit 84, the system state such as the traveling mode in traveling, the upper limit guard value Gmax, and the lower limit guard value Gmin stored in the storage unit, not illustrated, of the electronic control unit 34 is acquired. Next, S2 that corresponds to the function of the target turbine rotational speed calculation unit 88 is executed. In S2, the base target turbine rotational speed ntb* (rpm) is calculated from the relationship map illustrated in FIG. 4 based on the actual output shaft rotational speed no (rpm) and the actual accelerator operation amount Acc (%). The target turbine rotational speed nt* (rpm) that is restricted within a range of the upper limit guard value Gmax to the lower limit guard value Gmin acquired in S1 is calculated from the calculated base target turbine rotational speed ntb*.

Next, S3 that corresponds to the function of the traveling mode determination unit 86 is executed. In S3, a determination as to whether or not the traveling mode selected by the electronic control unit 34 during traveling of the vehicle is the gear traveling mode is performed. When a positive determination is made in S3, that is, when the traveling mode is the gear traveling mode, S4 that corresponds to the functions of the switching target turbine rotational speed calculation unit 90 and the switching turbine rotational speed calculation unit 92 is executed. When a negative determination is made in S3, that is, when the traveling mode is the belt traveling mode, S5 that corresponds to the functions of the switching target turbine rotational speed calculation unit 90 and the switching turbine rotational speed calculation unit 92 is executed. In S4, the upshift turbine rotational speed ntup is calculated by multiplying the actual output shaft rotational speed no of the output shaft 28 by the EL gear ratio $\gamma_{EL}$ of the gear power transmission mechanism 22. The upshift target turbine rotational speed nt*up (nt*=nt*up) for the upshift, which switches the torque transmission path from the second transmission path to the first transmission path, is calculated. In S5, the downshift turbine rotational speed ntdw is calculated by the actual output shaft rotational speed no of the output shaft 28 from the power ON downshift turbine rotational speed calculation line L1 illustrated in FIG. 4 and FIG. 5. The downshift target turbine rotational speed nt*dw (nt*=nt*dw) for the downshift, which switches the torque transmission path from the first transmission path to the second transmission path, is calculated.

Next, S6 that corresponds to the function of the shift switching determination unit 94 is executed. In S6, a determination as to whether or not to perform the upshift, which switches the torque transmission path from the second transmission path to the first transmission path, is performed by using the upshift target turbine rotational speed nt*up calculated in S4 and the upshift turbine rotational speed ntup. When a negative determination is made in S6, that is, when the upshift turbine rotational speed ntup is less than or equal to the upshift target turbine rotational speed nt*up, S1 is executed again. When a positive determination is made in S6, that is, when the upshift turbine rotational speed ntup exceeds the upshift target turbine rotational speed nt*up, S7 that corresponds to the function of the shift switching determination unit 94 is executed. In S7, the system state, that is, the traveling mode, acquired in S1 is changed to the belt traveling mode (traveling mode=belt traveling mode). Next, S8 that corresponds to the function of the clutch switching controller 96 is executed. In S8, a clutch-to-clutch shift that releases the forward traveling clutch Ca and engages the belt traveling clutch Cb is executed. Then, the meshing clutch D is released.

Next, S9 that corresponds to the function of the shift switching determination unit 94 is executed. In S9, a determination as to whether or not to perform the power ON downshift, which switches the torque transmission path from the first transmission path to the second transmission path, is performed by using the downshift target turbine rotational speed nt*dw and the downshift turbine rotational speed ntdw calculated in S5. When a negative determination is made in S9, that is, when the downshift turbine rotational speed ntdw exceeds the downshift target turbine rotational speed nt*dw, S1 is executed again. When a positive determination is made in S9, that is, when the downshift turbine rotational speed ntdw is less than or equal to the downshift target turbine rotational speed nt*dw, S10 that corresponds to the function of the shift switching determination unit 94 is executed. In S10, the system state, that is, the traveling mode, acquired in S1 is changed to the gear traveling mode (traveling mode=gear traveling mode). Next, S11 that corresponds to the function of the clutch switching controller 96 is executed. In S11, first, the meshing clutch D is engaged. Then, a clutch-to-clutch shift that engages the forward traveling clutch Ca and releases the belt traveling clutch Cb is executed.

Next, S12 that corresponds to the function of the clutch switching completion determination unit 98 is executed. In S12, a determination as to whether or not the clutch-to-clutch shift executed in S8 or S11 is completed is performed. When a negative determination is made in S12, S12 is executed again. When a positive determination is made in S12, S13 that corresponds to the function of the traveling state determination unit 100 is executed. In S13, a determination as to whether or not the actual traveling state of the vehicle is the belt traveling is performed from the actual engaged state of the belt traveling clutch Cb. When a positive determination is made in S13, that is, when the traveling state of the vehicle is the belt traveling, S14 that corresponds to the function of the target primary rotational speed calculation unit 102 is executed. When a negative determination is made in S13, that is, when the traveling state of the vehicle is the gear traveling, S15 that corresponds to the function of the target primary rotational speed calculation unit 102 is executed. In S14, the target turbine rotational speed nt* calculated in S2 is set as the target primary rotational speed nin* (nin*=nt*). In S15, the γmax rotational speed nγmax that is set in advance to cause the shift ratio γ of the continuously variable transmission mechanism 20 to have the maximum shift ratio γmax is set as the target primary rotational speed nin* (nin*=nγmax).

Next, S16 that corresponds to the function of the CVT shift ratio controller 104 is executed. In S16, the target shift ratio γ* is calculated based on the target primary rotational speed nin* calculated in S14 or S15. The shift ratio γ of the continuously variable transmission mechanism 20 is controlled to have the calculated target shift ratio γ*.

FIG. 5 is a diagram illustrating a state in which the upper limit guard value Gmax (rpm) and the lower limit guard value Gmin (rpm) are set during traveling of the vehicle, and, for example, the switching control process switching from the gear traveling to the belt traveling or from the belt traveling to the gear traveling is executed based on the flowchart illustrated in FIG. 6. In FIG. 5, the accelerator operation amount Acc is, for example, 20% when the switching control process switching from the gear traveling to the belt traveling is executed. The accelerator operation amount Acc is, for example, 100% when the switching control process switching from the belt traveling to the gear traveling is executed. FIG. 4 is a comparative diagram to FIG. 5 and illustrates when the upper limit guard value Gmax (rpm) and the lower limit guard value Gmin (rpm) are not set during traveling of the vehicle.

When switching is made from the gear traveling to the belt traveling, that is, when the upshift which switches the torque transmission path from the second transmission path to the first transmission path is performed, the base target turbine rotational speed ntb* is calculated as a base target turbine rotational speed ntb*20 from the relationship map illustrated in FIG. 4 in S2 of the flowchart in FIG. 6 since the accelerator operation amount Acc is 20%. The calculated base target turbine rotational speed ntb*20 is lower than the lower limit guard value Gmin as illustrated in FIG. 5. Thus, the lower limit guard value Gmin is set as a target turbine rotational speed nt*1. In S4 of the flowchart in FIG. 6, the target turbine rotational speed nt*1 set in S2 is set as an upshift target turbine rotational speed nt*up1 (refer to FIG. 5) for the upshift. When switching is made from the gear traveling to the belt traveling from S6 through S8 and S12 of the flowchart in FIG. 6, that is, when the torque transmission path is switched from the second transmission path to the first transmission path, the target turbine rotational speed nt*1 set in S2 is set as a target primary rotational speed nin*1 (refer to FIG. 5) in S14 of the flowchart in FIG. 6. Accordingly, when the torque transmission path is switched from the second transmission path to the first transmission path, the difference between the upshift target turbine rotational speed nt*up1 (rpm) and the target primary rotational speed nin*1 (rpm) is suitably decreased.

FIG. 5 illustrates a comparative example in which the upshift target turbine rotational speed nt*up and the target primary rotational speed nin* are independently calculated by, for example, the output shaft rotational speed (vehicle speed) no and the accelerator operation amount Acc. In the comparative example, when the gear traveling is performed, the upshift target turbine rotational speed nt*up is set as an upshift target turbine rotational speed nt*uph (refer to FIG. 5) from the accelerator operation amount Acc of 20%. When the belt traveling is performed, the lower limit guard value Gmin is set as the target primary rotational speed nin*1 in the same manner as the flowchart in FIG. 6 since, though the accelerator operation amount Acc is 20%, the target primary rotational speed set from the accelerator operation amount Acc of 20% is lower than the lower limit guard value Gmin. Thus, when the torque transmission path is switched from the second transmission path to the first transmission path, the difference between the upshift target turbine rotational speed nt*uph (rpm) and the target primary rotational speed nin*1 (rpm) in the comparative example illustrated in FIG. 5 is greater than the difference between the upshift target turbine rotational speed nt*up1 (rpm) and the target primary rotational speed nin*1 (rpm) set by the flowchart in FIG. 6. A solid line L2 illustrated in FIG. 5 is a line illustrating the actual turbine rotational speed nt of the turbine shaft 32.

When the torque transmission path is switched from the second transmission path to the first transmission path, the difference between the actual turbine rotational speed nt of the turbine shaft 32 at a switching start time point A1 and the actual turbine rotational speed nt of the turbine shaft 32 at a switching completion time point A2 is reduced further than the comparative example in FIG. 5. A broken line L3 illustrated in FIG. 5 is a line illustrating the actual turbine rotational speed nt of the turbine shaft 32 when the upshift target turbine rotational speed nt*uph and the target primary rotational speed nin*1 set by the comparative example in FIG. 5 are used.

When switching is made from the belt traveling to the gear traveling, that is, when the downshift which switches the torque transmission path from the first transmission path to the second transmission path is performed, the base target turbine rotational speed ntb* is calculated as a base target turbine rotational speed ntb*100 from the relationship map illustrated in FIG. 4 in S2 of the flowchart in FIG. 6 since the accelerator operation amount Acc is 100%. The calculated base target turbine rotational speed ntb*100 is higher than the upper limit guard value Gmax as illustrated in FIG. 5. Thus, the upper limit guard value Gmax is set as a target turbine rotational speed nt*2. In S5 of the flowchart in FIG. 6, the target turbine rotational speed nt*2 set in S2 is set as the downshift target turbine rotational speed nt*dw (refer to FIG. 5) for the downshift. When switching is made from the belt traveling to the gear traveling from S9 through S12 of the flowchart in FIG. 6, that is, when the torque transmission path is switched from the first transmission path to the second transmission path, the target turbine rotational speed nt*2 set in S2 is set as an upshift target turbine rotational speed nt*up2 (refer to FIG. 5) for the upshift in S4 of the flowchart in FIG. 6. Accordingly, when the torque transmission path is switched from the first transmission path to the second transmission path, the difference between the actual turbine rotational speed nt of the turbine shaft 32 at a switching start time point B1 and the actual turbine rotational speed nt of the turbine shaft 32 at a switching completion time point B2 is suitably reduced.

As described above, according to the electronic control unit 34 of the drive system 12 of the first embodiment, the target turbine rotational speed nt* restricted in a range of the upper limit guard value Gmax of the turbine rotational speed nt in the gear power transmission mechanism 22 to the lower limit guard value Gmin of the turbine rotational speed nt in the continuously variable transmission mechanism 20 is calculated. The switching target turbine rotational speed for switching between the first transmission path and the second transmission path and the target primary rotational speed nin* for controlling the shift ratio of the continuously variable transmission mechanism 20 are calculated based on the target turbine rotational speed nt*. Thus, since the switching target turbine rotational speed and the target primary rotational speed nin* are calculated based on the target input shaft rotational speed nt* restricted in a range of the upper limit guard value Gmax to the lower limit guard value Gmin, the difference between the switching target turbine rotational speed and the target primary rotational speed nin* is suitably decreased. When switching is made between the first transmission path and the second transmission path, the difference between the actual turbine rotational speed nt of the turbine shaft 32 at the switching start time point and the actual turbine rotational speed nt of the turbine shaft 32 at the switching completion time point is reduced.

According to the electronic control unit 34 of the drive system 12 of the first embodiment, the base target turbine rotational speed ntb* is calculated based on the actual output shaft rotational speed no and the actual accelerator operation amount Acc from the relationship map in which the relationship between the output shaft rotational speed no and the base target turbine rotational speed ntb* is set in advance and stored with the accelerator operation amount Acc as a parameter. When the base target turbine rotational speed ntb* is lower than the lower limit guard value Gmin, the lower limit guard value Gmin is set as the target turbine rotational speed nt*. When the base target turbine rotational speed ntb* is higher than the upper limit guard value Gmax, the upper limit guard value Gmax is set as the target turbine rotational speed nt*. When the base target turbine rotational speed ntb* is greater than or equal to the lower limit guard value Gmin and less than or equal to the upper limit guard value Gmax, the base target turbine rotational speed ntb* is set as the target turbine rotational speed nt*. Thus, the target turbine rotational speed nt* is restricted in a range of the upper limit guard value Gmax to the lower limit guard value Gmin.

According to the electronic control unit 34 of the drive system 12 of the first embodiment, the target primary rotational speed nin* is the target turbine rotational speed nt*. Thus, the target primary rotational speed nin* can be easily calculated from the target turbine rotational speed nt*.

According to the electronic control unit 34 of the drive system 12 of the first embodiment, the switching target turbine rotational speed is the upshift target turbine rotational speed nt*up for the upshift which switches the torque transmission path from the second transmission path to the first transmission path. The upshift is performed when the upshift turbine rotational speed ntup exceeds the upshift target turbine rotational speed nt*up. Thus, when the torque transmission path is switched from the second transmission path to the first transmission path, the difference between the actual turbine rotational speed nt of the turbine shaft 32 at the switching start time point A1 and the actual turbine rotational speed nt of the turbine shaft 32 at the switching completion time point A2 is suitably reduced.

According to the electronic control unit 34 of the drive system 12 of the first embodiment, the upshift target turbine rotational speed nt*up is the target turbine rotational speed nt*. Thus, the upshift target turbine rotational speed nt*up can be easily calculated from the target turbine rotational speed nt*.

According to the electronic control unit 34 of the drive system 12 of the first embodiment, the downshift target turbine rotational speed nt*dw is the target turbine rotational speed nt*. Thus, the downshift target turbine rotational speed nt*dw can be easily calculated from the target turbine rotational speed nt*.

Next, a second embodiment of the present disclosure will be described. Common parts in the first embodiment and the second embodiment will be designated by the same reference signs and will not be described.

FIG. 7 is a diagram describing an electronic control unit of the drive system 12 of a second embodiment of the present disclosure. The electronic control unit of the present embodiment is approximately the same as the electronic control unit 34 of the first embodiment except that the clutch switching controller 96 in FIG. 3 has an additional function, compared to the electronic control unit 34 of the first embodiment.

When the traveling mode determination unit 86 determines that the traveling mode is the belt traveling, and the clutch switching controller 96 determines that the power ON traveling in which the accelerator pedal (accelerator) is stepped on to increase the base target turbine rotational speed ntb* (rpm) above the upper limit guard value Gmax (rpm) is performed, and the clutch switching controller 96 determines that the downshift turbine rotational speed ntdw (rpm) calculated by the switching turbine rotational speed calculation unit 92 is less than the downshift target turbine rotational speed nt*dw (rpm) calculated by the switching target turbine rotational speed calculation unit 90 (nt*dw<ntdw), the clutch switching controller 96 prohibits execution of a clutch-to-clutch shift that engages the forward traveling clutch Ca and releases the belt traveling clutch Cb, that is, switching of the torque transmission path from the first transmission path to the second transmission path.

FIG. 7 is a flowchart describing one example of a control operation in the electronic control unit of the second embodiment when the accelerator pedal is stepped on during traveling in, for example, the belt traveling mode.

In the flowchart in FIG. 7, in S20 that corresponds to the function of the clutch switching controller 96, a determination is performed as to whether or not the power ON traveling in which the accelerator pedal is stepped on to increase the base target turbine rotational speed ntb* (rpm) above the upper limit guard value Gmax (rpm) is performed. When a positive determination is made in S20, a determination as to whether or not the downshift target turbine rotational speed nt*dw (rpm) is less than the downshift turbine rotational speed ntdw (rpm) (nt*dw<ntdw) is performed in S21 that corresponds to the function of the clutch switching controller 96. When a positive determination is made in S21, execution of a clutch-to-clutch shift that engages the forward traveling clutch Ca and releases the belt traveling clutch Cb, that is, switching of the torque transmission path from the first transmission path to the second transmission path, is prohibited in S22 that corresponds to the function of the clutch switching controller 96. When a negative determination is made in S20 or S21, S1 in FIG. 6, for example, is executed.

As described above, according to the electronic control unit of the drive system 12 of the second embodiment, the switching target turbine rotational speed is the downshift target turbine rotational speed nt*dw for the downshift which switches the torque transmission path from the first transmission path to the second transmission path. The downshift is performed when the downshift turbine rotational speed ntdw that is acquired by the actual output shaft rotational speed no of the output shaft 28 from the power ON downshift turbine rotational speed calculation line L1 stored in advance is less than or equal to the downshift target turbine rotational speed nt*dw. When the accelerator pedal is stepped on to increase the base target turbine rotational speed ntb* above the upper limit guard value Gmax, and the downshift turbine rotational speed ntdw is greater than the downshift target turbine rotational speed nt*dw, switching of the torque transmission path from the first transmission path to the second transmission path is prohibited. Thus, while the base target turbine rotational speed ntb* corresponding to the accelerator operation amount Acc is calculated when the accelerator pedal is stepped on to increase the base target turbine rotational speed ntb* above the upper limit guard value Gmax, the downshift target turbine rotational speed nt*dw is restricted by the upper limit guard value Gmax. Thus, the downshift target turbine rotational speed nt*dw is decreased below the downshift turbine rotational speed ntdw. Accordingly, even when the accelerator pedal is stepped on to increase the base target input shaft rotational speed ntb* above the upper limit guard value Gmax, the torque transmission path is not switched from the first transmission path to the second transmission path. Thus, a change in the behavior of the turbine rotational speed nt of the turbine shaft 32 can be suitably reduced.

While the first and second embodiments of the present disclosure are heretofore described in detail based on the drawings, the present disclosure is applied to other aspects than the first and second embodiments.

For example, while the continuously variable transmission mechanism 20 is a belt CVT including the primary pulley 60, the secondary pulley 58, and the power transmission belt 62 wound between the pulleys 58, 60 in the first and second embodiments, a continuously variable transmission mechanism such as a toroidal CVT may be used.

While the gear power transmission mechanism 22 has one gear ratio, that is, the EL gear ratio $\gamma_{EL}$, in the first and second embodiments, the structure of the gear power transmission mechanism 22 may be changed to a multi-gear transmission type having, for example, two or more gear ratios.

While, in the first and second embodiments, the base target turbine rotational speed ntb* is calculated based on the actual output shaft rotational speed no and the actual accelerator operation amount Acc from the relationship map in which the relationship between the output shaft rotational speed no and the base target turbine rotational speed ntb* is set in advance and stored with the accelerator operation amount Acc as a parameter, the base target turbine rotational speed ntb* may be calculated based on the actual output shaft rotational speed no and the actual accelerator operation amount Acc from, for example, a formula stored in advance.

While the EL gear ratio $\gamma_{EL}$ based on the second transmission path is set to a value greater than the maximum shift ratio $\gamma$max of the continuously variable transmission mechanism 20 in the first and second embodiments, the EL gear ratio $\gamma_{EL}$, for example, may be set to a value less than a minimum shift ratio $\gamma$min of the continuously variable transmission mechanism 20.

While the target primary rotational speed calculation unit 102 sets the target primary rotational speed nin* to the target turbine rotational speed nt* (nt*=nin*) in the first and second embodiments, the target primary rotational speed nin* does not have to be set to the target turbine rotational speed nt*. For example, the target primary rotational speed nin* may be set to a value acquired by increasing or decreasing the target turbine rotational speed nt* by a predetermined value. Alternatively, the target primary rotational speed nin* may be set to a value acquired by substituting the target turbine rotational speed nt* in a formula set in advance. That is, the target primary rotational speed nin* may be calculated based on the target turbine rotational speed nt*.

While the switching target turbine rotational speed calculation unit 90 sets the upshift target turbine rotational speed nt*up and the downshift target turbine rotational speed nt*dw to the target turbine rotational speed nt* (nt*=nt*up=nt*dw) in the first and second embodiments, the upshift target turbine rotational speed nt*up and the downshift target turbine rotational speed nt*dw do not have to be set to the target turbine rotational speed nt*. For example, the upshift target turbine rotational speed nt*up and the downshift target turbine rotational speed nt*dw may be set to a value acquired by increasing or decreasing the target turbine rotational speed nt* by a predetermined value. Alternatively, the upshift target turbine rotational speed nt*up and the downshift target turbine rotational speed nt*dw may be set to a value acquired by substituting the target turbine rotational speed nt* in a formula set in advance. That is, the upshift target turbine rotational speed nt*up and the downshift target turbine rotational speed nt*dw may be calculated based on the target turbine rotational speed nt*.

While the switching turbine rotational speed calculation unit 92 calculates the upshift turbine rotational speed ntup (rpm) by multiplying the actual output shaft rotational speed no of the output shaft 28 by the EL gear ratio $\gamma_{EL}$ of the gear power transmission mechanism 22 in the first and second embodiments (ntup=no×$\gamma_{EL}$), the actual turbine rotational speed nt (rpm), for example, detected from the turbine rotational speed sensor 76 may be used instead of the upshift turbine rotational speed ntup (rpm).

The embodiments are for illustrative purposes, and the present disclosure can be embodied in various modified or improved forms based on the knowledge of those skilled in the art.

What is claimed is:

1. A control device for a vehicle drive system, the vehicle drive system including, between an input shaft to which torque output from a drive power source is transmitted and an output shaft outputting torque to a drive wheel of a vehicle, a continuously variable transmission mechanism, a gear power transmission mechanism having at least one gear ratio, and a clutch mechanism configured to selectively switch between a first transmission path through which the torque transmitted to the input shaft is transmitted to the output shaft via the continuously variable transmission mechanism and a second transmission path through which the torque transmitted to the input shaft is transmitted to the output shaft via the gear power transmission mechanism, the control device comprising an electronic control unit configured to:
   (i) selectively switch between the first transmission path and the second transmission path in accordance with a traveling state of a vehicle,
   (ii) calculate a target input shaft rotational speed, the target input shaft rotational speed being restricted in a range between an upper limit guard value of a rotational speed of the input shaft in the gear power transmission mechanism and a lower limit guard value of the rotational speed of the input shaft in the continuously variable transmission mechanism, and
   (iii) calculate a switching target input shaft rotational speed and a continuously variable transmission target primary rotational speed, the switching target input shaft rotational speed being for switching between the first transmission path and the second transmission path and the continuously variable transmission target primary rotational speed being for controlling a shift ratio of the continuously variable transmission mechanism based on the target input shaft rotational speed.

2. The control device according to claim 1, wherein the electronic control unit is configured to:
   (i) calculate a base target input shaft rotational speed based on a vehicle speed and an accelerator operation amount from a relationship stored in advance,
   (ii) set the lower limit guard value as the target input shaft rotational speed when the base target input shaft rotational speed is lower than the lower limit guard value,
   (iii) set the upper limit guard value as the target input shaft rotational speed when the base target input shaft rotational speed is higher than the upper limit guard value, and
   (iv) set the base target input shaft rotational speed as the target input shaft rotational speed when the base target input shaft rotational speed is greater than or equal to the lower limit guard value and less than or equal to the upper limit guard value.

3. The control device according to claim 1, wherein the continuously variable transmission target primary rotational speed is the target input shaft rotational speed.

4. The control device according to claim 1, wherein the switching target input shaft rotational speed is an upshift target input shaft rotational speed for switching a torque transmission path from the second transmission path to the first transmission path, and the electronic control unit is configured to perform an upshift when the actual rotational speed of the input shaft exceeds the upshift target input shaft rotational speed.

5. The control device according to claim 4, wherein the upshift target input shaft rotational speed is the target input shaft rotational speed.

6. The control device according to claim 2, wherein
   the switching target input shaft rotational speed is a downshift target input shaft rotational speed for switching a torque transmission path from the first transmission path to the second transmission path, and
   the electronic control unit is configured to:
   (i) perform a downshift when a downshift input shaft rotational speed acquired by an actual rotational speed of the output shaft from a downshift input shaft rotational speed calculation line stored in advance is less than or equal to the downshift target input shaft rotational speed,
   (ii) allow an accelerator to be stepped on to increase the base target input shaft rotational speed above the upper limit guard value, and
   (iii) prohibit switching of a torque transmission path from the first transmission path to the second transmission path, when the downshift input shaft rotational speed is less than the downshift target input shaft rotational speed.

7. The control device according to claim 6, wherein the downshift target input shaft rotational speed is the target input shaft rotational speed.

* * * * *